US011290262B2

(12) United States Patent
Buck

(10) Patent No.: US 11,290,262 B2
(45) Date of Patent: Mar. 29, 2022

(54) METHOD AND DEVICES FOR COMMUNICATING SECURELY BETWEEN DEVICES

(71) Applicant: LEGIC Identsystems AG, Wetzikon (CH)

(72) Inventor: Martin Buck, Zug (CH)

(73) Assignee: LEGIC Identsystems AG, Wetzikon (CH)

( * ) Notice: Subject to any disclaimer, the term of this patent is extended or adjusted under 35 U.S.C. 154(b) by 274 days.

(21) Appl. No.: 16/631,534

(22) PCT Filed: Jul. 17, 2018

(86) PCT No.: PCT/EP2018/069349
§ 371 (c)(1),
(2) Date: Jan. 16, 2020

(87) PCT Pub. No.: WO2019/016185
PCT Pub. Date: Jan. 24, 2019

(65) Prior Publication Data
US 2020/0204360 A1      Jun. 25, 2020

(30) Foreign Application Priority Data
Jul. 18, 2017   (CH) .................................... 00936/17

(51) Int. Cl.
*H04L 29/06* (2006.01)
*H04L 9/08* (2006.01)
*H04L 9/14* (2006.01)

(52) U.S. Cl.
CPC ............ *H04L 9/0847* (2013.01); *H04L 9/088* (2013.01); *H04L 9/0822* (2013.01);
(Continued)

(58) Field of Classification Search
CPC ... H04L 9/0847; H04L 9/0822; H04L 9/0836; H04L 9/0861; H04L 9/088; H04L 9/0891; H04L 9/14; H04L 63/0435; H04L 9/083
See application file for complete search history.

(56) References Cited

U.S. PATENT DOCUMENTS

| 8,892,865 | B1 * | 11/2014 | Roth ..................... H04L 9/0822 713/150 |
| 10,652,014 | B2 * | 5/2020 | Wright .................... H04L 9/008 |
| 2015/0288512 | A1 * | 10/2015 | McGregor ............ H04L 9/0861 713/193 |

OTHER PUBLICATIONS

Sep. 17, 2018—(PCT/EP) International Search Report—App 2018/069349.
(Continued)

*Primary Examiner* — Yogesh Paliwal
(74) *Attorney, Agent, or Firm* — Banner & Witcoff, Ltd.

(57) ABSTRACT

For communicating securely between electronic devices using symmetric key encryption, a first electronic device transfers to a second electronic device metadata with positional information which indicates the position of a first cryptographic key in a cryptographic key hierarchy. The second electronic device derives the first cryptographic key by way of a one-way function from a second cryptographic key stored in the second electronic device, using the positional information received from the first electronic device. Subsequently, the first electronic device and the second electronic device communicate data securely with symmetric key encryption using the first cryptographic key.

20 Claims, 5 Drawing Sheets

(52) U.S. Cl.
CPC .......... *H04L 9/0836* (2013.01); *H04L 9/0861* (2013.01); *H04L 9/0891* (2013.01); *H04L 9/14* (2013.01); *H04L 63/0435* (2013.01); *H04L 9/083* (2013.01)

(56) References Cited

OTHER PUBLICATIONS

Wang, Weichao; Owens, Rodney; Li, Zhiwei; and Bhargava, Bharat, "Secure and Efficient Access to Outsourced Data," (Proceedings of the 2009 ACM Workshop on Cloud Computing Security, Nov. 13, 2009), pp. 55-66.

Tang, Shaohua; Li, Xiaoyu; Huang, Xinyi; Xiang, Yang; and Xu, Lingling, "Achieving Simple, Secure and Efficient Hierarchical Access Control in Cloud Computing," (IEEE Transactions on Computers, IEEE, USA, vol. 65, No. 7, Jul. 1, 2016), pp. 2325-2331.

* cited by examiner

METHOD AND DEVICES FOR COMMUNICATING SECURELY BETWEEN DEVICES

CROSS-REFERENCE TO RELATED APPLICATIONS

The present application is a U.S. National Phase filing of International Application No. PCT/EP2018/069349, filed on Jul. 17, 2018, and claiming priority to Switzerland Patent Application No. 00936/17 filed Jul. 18, 2017. The present application claims priority to and the benefit of all the above-identified applications, which are all incorporated by reference herein in their entireties.

Field of the Technology

The present disclosure relates to a method and devices for communicating securely between electronic devices. Specifically, the present disclosure relates to a method and devices for communicating securely between electronic devices using symmetric key encryption.

BACKGROUND

In symmetric key encryption, the same cryptographic key is used for both encryption and decryption of data exchanged between the communicating devices. The cryptographic key is thus a secret shared between the communicating devices. The fact that the communicating devices must all have access to the secret cryptographic key is considered a drawback of symmetric key encryption—if just one of the devices is compromised, communication between all respective devices is no longer secure.

EP 2424154 describes an encryption processing system implementing a hierarchical predicate encryption scheme. According to EP 2424154, a key generation device (root) generates secret keys for devices of lower level users by using a master secret key. The secret keys are transferred from the key generation device to the respective devices of the lower level users. A lower level key, generated by the upper level device from a higher level key, has more restricted capabilities than the higher level key.

EP 2667538 describes a hierarchical identity-based encryption system which includes a setup device and a plurality of second devices forming a tree-type hierarchical structure. The setup device forms the root of the hierarchical structure and the second devices form different levels of hierarchies. The setup device 200 generates a public key which is commonly used by each of the second devices and identity-based secret keys for each of the second devices of a first or second level below the root. A second device decrypts encrypted data using a public key and its own secret key. A second device further generates secret keys for the further second devices at its lower (child) hierarchy level using its own secret key and the user-identity associated with the child second device. The hierarchical asymmetric encryption system can be implemented correspondingly in hierarchical organizations where upper hierarchical levels in the organization have the right to generate and distribute secret keys for the devices of the members in their respective lower hierarchical levels in the organization. The secret key of any second electronic device must be transferred from a setup device or a higher level second electronic device. If such a transfer is compromised the respective secret key and any secret keys generated from said respective secret key are compromised.

U.S. Pat. No. 8,892,865 describes systems and methods for authentication which generate keys from secret credentials shared between authenticating parties and authenticators. Generation of the keys may involve utilizing specialized information in the form of parameters that are used to specialize keys. Keys and/or information derived from keys held by multiple authorities may be used to generate other keys such that signatures requiring such keys and/or information can be verified without access to the keys. Keys may also be derived to form a hierarchy of keys that are distributed such that a key holder's ability to decrypt data depends on the key's position in the hierarchy relative to the position of a key used to encrypt the data. Key hierarchies may also be used to distribute key sets to content processing devices to enable the devices to decrypt content such that sources or potential sources of unauthorized content are identifiable from the decrypted content.

SUMMARY

Aspects of this disclosure provide a method and devices for communicating securely between electronic devices using symmetric key encryption. In particular, aspects of the present disclosure to provide a method and devices for secured communication using symmetric key encryption with reduced necessity of transferring secret keys.

According to the present disclosure, these aspects may be achieved through the features of the independent claims. In addition, further advantageous embodiments follow from the dependent claims and the description.

According to the present disclosure, the above-mentioned aspects may be achieved in that for communicating securely between electronic devices, using symmetric key encryption, a circuit of a first electronic device transfers to a second electronic device a data message with metadata. The metadata includes positional information of a first cryptographic key of a cryptographic key hierarchy. In the cryptographic key hierarchy, a lower level cryptographic key, being positioned in a lower level in the cryptographic key hierarchy than a higher level cryptographic key, is derived by way of a one-way function from the higher level cryptographic key and positional information defining a position of the lower level cryptographic key in the cryptographic key hierarchy. A circuit of the second electronic device derives the first cryptographic key by way of the one-way function from a second cryptographic key stored in the second electronic device and the positional information received from the first electronic device. The circuit of the second electronic device generates an authentication data message, by encrypting authentication data included in the metadata received from the first electronic device, using the first cryptographic key. The authentication data message is transmitted from the second electronic device to the first electronic device. A circuit of the first electronic device decrypts the authentication data message, using the first cryptographic key to obtain the authentication data. The circuit of the first electronic device confirms authenticity of the second electronic device by verifying the authentication data. Upon confirming authenticity of the second electronic device, data is communicated securely between the first electronic device and the second electronic device, e.g. with symmetric key encryption using the first cryptographic key.

Using the stored secret cryptographic key and the received positional information, the second electronic device is enabled to derive and determine the cryptographic key that the first electronic device requests to use for secured communication using symmetric key encryption. With just one secret cryptographic key stored in each electronic device, hierarchical key management is made possible for a plurality of electronic devices, where hierarchically higher electronic devices (having "ancestor" cryptographic keys higher up in the cryptographic key hierarchy) may dynamically and flexibly derive the cryptographic keys used by their hierarchically lower electronic devices (having respective "children" cryptographic keys lower in the cryptographic key hierarchy) for symmetric key encryption.

If the first cryptographic key is more than one level lower in the cryptographic key hierarchy than the second cryptographic key, the circuit of the second electronic device derives any intermediary cryptographic key on the direct path in the cryptographic key hierarchy from the second cryptographic key to the first cryptographic key. In other words, the circuit of the second electronic device derives the first cryptographic key by applying the one-way function to the second cryptographic key stored in the second electronic device and to any intermediary cryptographic key, on a direct path in the cryptographic key hierarchy from the second cryptographic key to the first cryptographic key.

In an embodiment, the authentication data message is generated by the circuit of the second electronic device encrypting, as the authentication data, the positional information received from the first electronic device, using the first cryptographic key. The circuit of the first electronic device decrypts the authentication data message, using the first cryptographic key to obtain the positional information. The circuit of the first electronic device confirms the authenticity of the second electronic device by verifying the authentication data by comparing the positional information obtained by decrypting the authentication data message to the positional information included in the metadata.

In an embodiment, positional information of the second cryptographic key is stored in the second electronic device. The circuit of the second electronic device derives the first cryptographic key by way of the one-way function from the second cryptographic key stored in the second electronic device, the positional information of the second cryptographic key, and the positional information received from the first electronic device. In an embodiment, the positional information received from the first electronic device indicates a relative position of the first cryptographic key in the cryptographic key hierarchy with respect to a higher level cryptographic key, e.g. relative to the position of the second cryptographic key, in the cryptographic key hierarchy.

In a further embodiment, a key space identifier, included in the metadata, is transferred from the first electronic device to the second electronic device. The key space identifier defines the cryptographic key hierarchy or a subset of the cryptographic key hierarchy which include the first cryptographic key. Using the key space identifier, the circuit of the second electronic device selects the second cryptographic key, for deriving the first cryptographic key, from a plurality of secret cryptographic keys stored in the second electronic device.

In an embodiment, the circuit of the first electronic device encrypts data using the first cryptographic key. The first electronic device transfers to the second electronic device the data message including the encrypted data and the metadata. The circuit of the second electronic device derives the first cryptographic key by way of the one-way function from the second cryptographic key, stored in the second electronic device, using the metadata included in the data message. The circuit of the second electronic device decrypts the encrypted data included in the data message, using the first cryptographic key.

In a further embodiment, the circuit of the first electronic device encrypts authentication data using the first cryptographic key. The first electronic device transfers to the second electronic device the data message including the encrypted authentication data and the metadata. The circuit of the second electronic device derives the first cryptographic key by way of the one-way function from the second cryptographic key, stored in the second electronic device, using the metadata included in the data message. The circuit of the second electronic device decrypts the encrypted authentication data included in the data message, using the first cryptographic key. The circuit of the second electronic device encrypts authentication data using the first cryptographic key. The authentication data encrypted by the second electronic device is transferred from the second electronic device to the first electronic device. The circuit of the first electronic device decrypts and verifies the encrypted authentication data received from the second electronic device, using the first cryptographic key.

In an embodiment, the cryptographic key hierarchy is configured as a tree structure and the positional information defines a node in the tree structure. Each node in the tree structure represents a cryptographic key. A root node in the tree structure represents a master cryptographic key. Nodes in the tree structure at one level below the root node represent cryptographic keys derived by way of the one-way function from the master cryptographic key. A child node at a lower level in the tree structure represents a cryptographic key derived by way of the one-way function from the cryptographic key represented by a respective parent node of the child node in the tree structure.

In addition to the method of communicating securely between electronic devices using symmetric key encryption, the present disclosure also relates to an electronic device for communicating securely with another electronic device, using symmetric encryption. The electronic device comprises a circuit configured to perform the steps of: transferring to the other electronic device a data message with metadata, the metadata including positional information of a first cryptographic key of a cryptographic key hierarchy, whereby in the cryptographic key hierarchy a lower level cryptographic key, being positioned in a lower level in the cryptographic key hierarchy than a higher level cryptographic key, is derived by way of a one-way function from the higher level cryptographic key and positional information defining a position of the lower level cryptographic key in the cryptographic key hierarchy, the metadata enabling the other electronic device to derive the first cryptographic key by way of the one-way function from a second cryptographic key, stored in the other electronic device, and the positional information included in the metadata and to generate an authentication data message, by encrypting authentication data included in the metadata using the first cryptographic key; receiving the authentication data message from the other electronic device; decrypting the authentication data message, using the first cryptographic key to obtain the authentication data; confirming authenticity of the other electronic device by verifying the authentication data; and upon confirming authenticity of the other electronic device communicating data securely with the other electronic device, e.g. with symmetric key encryption using the first cryptographic key.

In an embodiment, the positional information included in the metadata enables the other electronic device to generate the authentication data message, by encrypting, as the authentication data, the positional information included in the metadata, using the first cryptographic key. The circuit of the electronic device is further configured to decrypt the authentication data message, using the first cryptographic key to obtain the positional information, and to confirm the authenticity of the other electronic device by comparing the positional information included in the metadata to the positional information obtained by decrypting the authentication data message.

In an embodiment, the circuit of the electronic device is further configured to transfer to the other electronic device a key space identifier included in the metadata, the key space identifier defining the cryptographic key hierarchy or a subset of the cryptographic key hierarchy which include the first cryptographic key, enabling the other electronic device to select the second cryptographic key, for deriving the first cryptographic key, from a plurality of secret cryptographic keys stored in the other electronic device, using the key space identifier received from the other electronic device.

In a further embodiment, the circuit of the electronic device is further configured to encrypt data using the first cryptographic key; to transfer to the other electronic device the data message including the encrypted data and the metadata, enabling the other electronic device to derive the first cryptographic key, using the metadata included in the data message, and to decrypt the encrypted data included in the data message, using the first cryptographic key.

In an embodiment, the circuit of the electronic device is further configured to encrypt authentication data using the first cryptographic key; to transfer to the other electronic device the data message including the encrypted authentication data and the metadata, enabling the other electronic device to derive the first cryptographic key, using the metadata included in the data message, and to decrypt the encrypted authentication data included in the data message, using the first cryptographic key; to receive from the other electronic device encrypted authentication data; and to decrypt and verify the encrypted authentication data received from the other electronic device using the first cryptographic key.

In addition to the method and electronic device for communicating securely between electronic devices using symmetric key encryption, the present disclosure also relates to a computer program product comprising a non-transient computer-readable medium having stored thereon computer program code configured to control a circuit of a first electronic device, for communicating securely with a second electronic device using symmetric encryption, such that the first electronic device performs the steps of: transferring to the second electronic device a data message with metadata, the metadata including positional information of a first cryptographic key of a cryptographic key hierarchy, whereby in the cryptographic key hierarchy a lower level cryptographic key, being positioned in a lower level in the cryptographic key hierarchy than a higher level cryptographic key, is derived by way of a one-way function from the higher level cryptographic key and positional information defining a position of the lower level cryptographic key in the cryptographic key hierarchy, the metadata enabling the second electronic device to derive the first cryptographic key by way of the one-way function from a second cryptographic key, stored in the second electronic device, and the positional information included in the metadata, and to generate an authentication data message, by encrypting authentication data included in the metadata using the first cryptographic key; receiving the authentication data message from the second electronic device; decrypting the authentication data message using the first cryptographic key to obtain the authentication data; confirming authenticity of the second electronic device by verifying the authentication data; and upon confirming authenticity of the second electronic device, communicating data securely with the second electronic device, e.g. with symmetric key encryption using the first cryptographic key.

In addition to the method and the electronic device for communicating securely between electronic devices using symmetric encryption, the present disclosure also relates to a further electronic device for communicating securely with another electronic device, using symmetric encryption. The further electronic device comprises a circuit configured to perform the steps of: receiving from the other electronic device a data message with metadata, the metadata including positional information of a first cryptographic key of a cryptographic key hierarchy, whereby in the cryptographic key hierarchy a lower level cryptographic key, being positioned in a lower level in the cryptographic key hierarchy than a higher level cryptographic key, is derived by way of a one-way function from the higher level cryptographic key and positional information defining a position of the lower level cryptographic key in the cryptographic key hierarchy; deriving the first cryptographic key by way of the one-way function from a second cryptographic key, stored in the electronic device, and the positional information received from the other electronic device; generating an authentication data message, by encrypting authentication data included in the metadata received from the other electronic device, using the first cryptographic key; transmitting the authentication data message to the other electronic device, enabling the other electronic device to decrypt the authentication data message, using the first cryptographic key to obtain the authentication data, to confirm authenticity of the electronic device by verifying the authentication data, and upon confirming authenticity of the electronic device, to communicate data securely with the other electronic device, e.g. with symmetric key encryption using the first 5 cryptographic key.

In an embodiment, the circuit of the electronic device is further configured to generate the authentication data message by encrypting, as the authentication data, the positional information received from the other electronic device, using the first cryptographic key, enabling the other electronic device to decrypt the authentication data message, using the first cryptographic key to obtain the positional information, and to confirm the authenticity of the electronic device by comparing the positional information obtained by decrypting the authentication data message to the positional information included in the metadata.

In an embodiment, the circuit of the electronic device is further configured to store in the electronic device positional information of the second cryptographic key; and to derive the first cryptographic key by way of the one-way function from the second cryptographic key stored in the electronic device, the positional information of the second cryptographic key stored in the electronic device, and the positional information received from the other electronic device.

In a further embodiment, the circuit of the electronic device is further configured to receive from the other electronic device a key space identifier included in the metadata, the key space identifier defining the cryptographic key hierarchy or a subset of the cryptographic key hierarchy which include the first cryptographic key; and to select the second cryptographic key, for deriving the first cryptographic key, from a plurality of secret cryptographic keys stored in the electronic device, using the key space identifier.

In an embodiment, the circuit of the electronic device is further configured to receive in the data message from the other electronic device encrypted data and metadata; to derive the first cryptographic key by way of the one-way function from the second cryptographic key, stored in the second electronic device, using the metadata included in the data message; and to decrypt the encrypted data included in the data message, using the first cryptographic key.

In a further embodiment, the circuit of the electronic device is further configured to receive in the data message from the other electronic device encrypted authentication data and metadata; to derive the first cryptographic key by way of the one-way function from the second cryptographic key, stored in the second electronic device, using the metadata included in the data message; to decrypt the encrypted authentication data included in the data message, using the first cryptographic key; to encrypt authentication data using the first cryptographic key; and to transfer the encrypted authentication data to the other electronic device, enabling the other electronic device to decrypt and verify the authentication data received from the electronic device using the first cryptographic key.

In addition to the method, and the electronic devices for communicating securely with other electronic devices using symmetric encryption, the present disclosure also relates to a computer program product comprising a non-transient computer-readable medium having stored thereon computer program code configured to control a circuit of a second electronic device, for communicating securely with a first electronic device using symmetric encryption, such that the second electronic device performs the steps of: receiving from the first electronic device a data message with metadata, the metadata including positional information of a first cryptographic key of a cryptographic key hierarchy, whereby in the cryptographic key hierarchy a lower level cryptographic key, being positioned in a lower level in the cryptographic key hierarchy than a higher level cryptographic key, is derived by way of a one-way function from the higher level cryptographic key and positional information defining a position of the lower level cryptographic key in the cryptographic key hierarchy; deriving the first cryptographic key by way of the one-way function from a second cryptographic key, stored in the second electronic device, and the positional information received from the first electronic device; generating an authentication data message, by encrypting authentication data included in the metadata received from the first electronic device, using the first cryptographic key; transmitting the authentication data message to the first electronic device, enabling the first electronic device to decrypt the authentication data message, using the first cryptographic key to obtain the authentication data, to confirm authenticity of the second electronic device by verifying the authentication data, and upon confirming authenticity of the second electronic device, to communicate data securely with the first electronic device, e.g. with symmetric key encryption using the first cryptographic key.

BRIEF DESCRIPTION OF THE DRAWINGS

The present disclosure will be explained in more detail, by way of example, with reference to the drawings in which.

DETAILED DESCRIPTION

Figure 1:
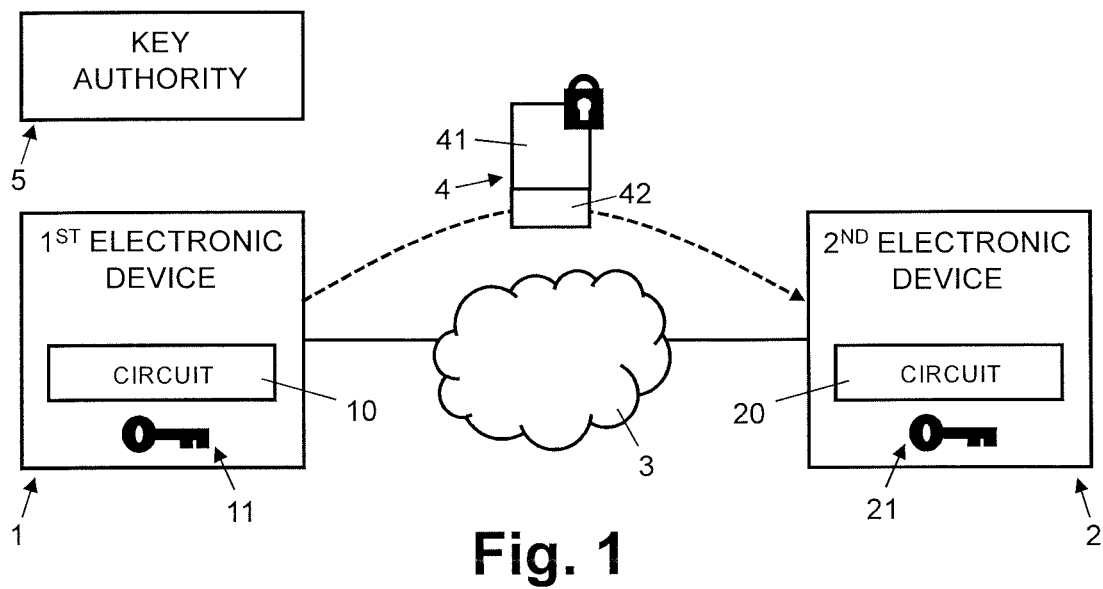
FIG. 1 shows a block diagram illustrating schematically a first electronic device and a second electronic device communicating data securely via a communication link, using symmetric key encryption according to the present disclosure.

In FIGS. 1-4, 6, 7, reference numeral 1 refers to a first electronic device and reference numeral 2 refers to a second electronic device. The first electronic device 1 and the second electronic device 2 are operable electronic devices, each comprising an electronic circuit 10, 20. One skilled in the art will understand that the circuits 10, 20 are programmable processors or other configurable electronic logic units, which are programmed or configured to execute various functions and steps, as described later in more detail. The first electronic device 1 and the second electronic device 2 are configured to communicate with each other via a communication link 3. Depending on the type or embodiment of the first electronic device 1 and the second electronic device 2 the communication link is a wired or contact-based communication link, or a wireless communication link, e.g. a close or short range communication link, such as an RFID (Radio Frequency IDentifier), NFC (Near Field Communication), BLE (Bluetooth Low Energy) or the like, a medium range communication link, such as WLAN (Wireless Local Area Network) or BT (Bluetooth), or a long distance communication link, such as GSM (Global System for Mobile Communication) or UMTS (Universal Mobile Telephone System) or the like. Accordingly and depending on the application and/or embodiment, the first electronic device 1 and the second electronic device 2 are implemented as fixed or mobile communication devices, e.g. a personal computer (desktop, laptop, notebook), a tablet computing device, a smart phone (mobile radio phone), a smart watch, a transponder, a smart card (chip card) or electronic dongle, etc.

Figure 3:
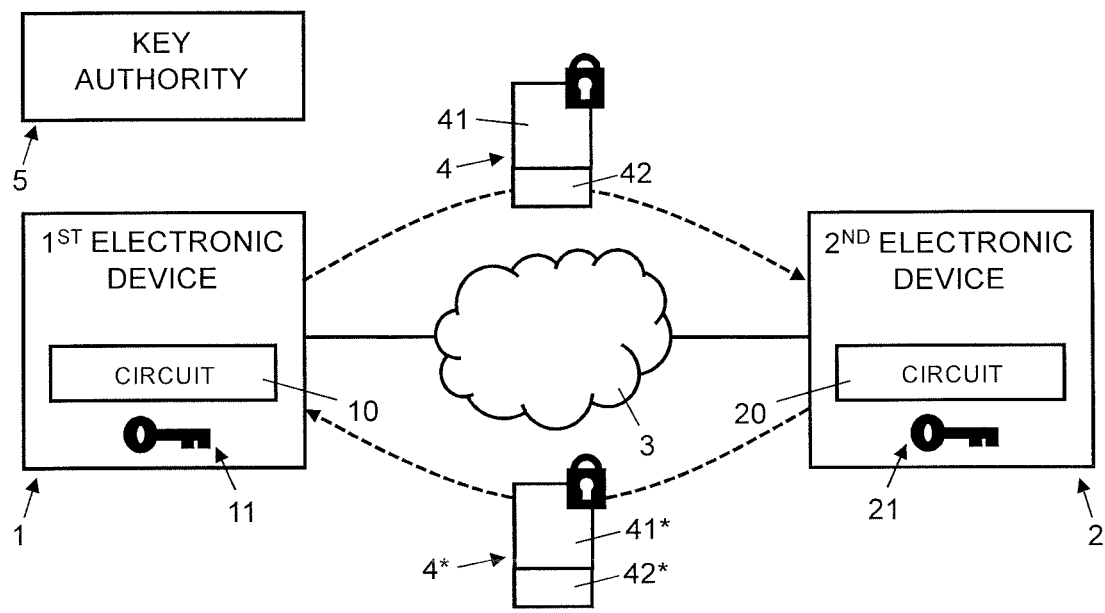
FIG. 3 shows a block diagram illustrating schematically a first electronic device and a second electronic device communicating securely via a communication link, by exchanging and verifying authentication data, using symmetric key encryption according to the present disclosure.
Figure 6:
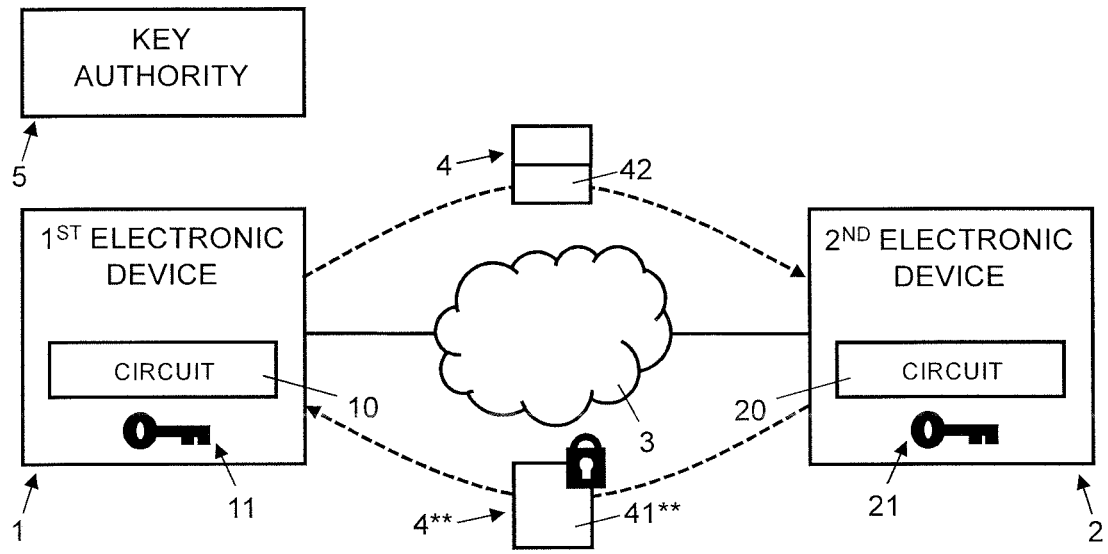
FIG. 6 shows a block diagram illustrating schematically a first electronic device and a second electronic device communicating data securely via a communication link, using symmetric key encryption and optionally exchanging and verifying authentication data according to the present disclosure.

As illustrated schematically in FIGS. 1, 3 and 6, the first electronic device 1 comprises a secret cryptographic key 11 stored securely in the first electronic device 1. The second electronic device 2 comprises a secret cryptographic key 21 stored securely in the second electronic device 2. The secret cryptographic keys 11, 21 stored in the electronic devices 1, 2 are generated by a key authority 5. The secret cryptographic keys 11, 21 are stored in the electronic devices 1, 2 in a secured fashion, e.g. by the key authority 5 in a secured process at manufacturing or configuration time of the electronic devices 1, 2. The key authority 5 comprises one or more computers with one or more processors configured to generate secret cryptographic keys of a cryptographic key hierarchy 6.

Figure 5:
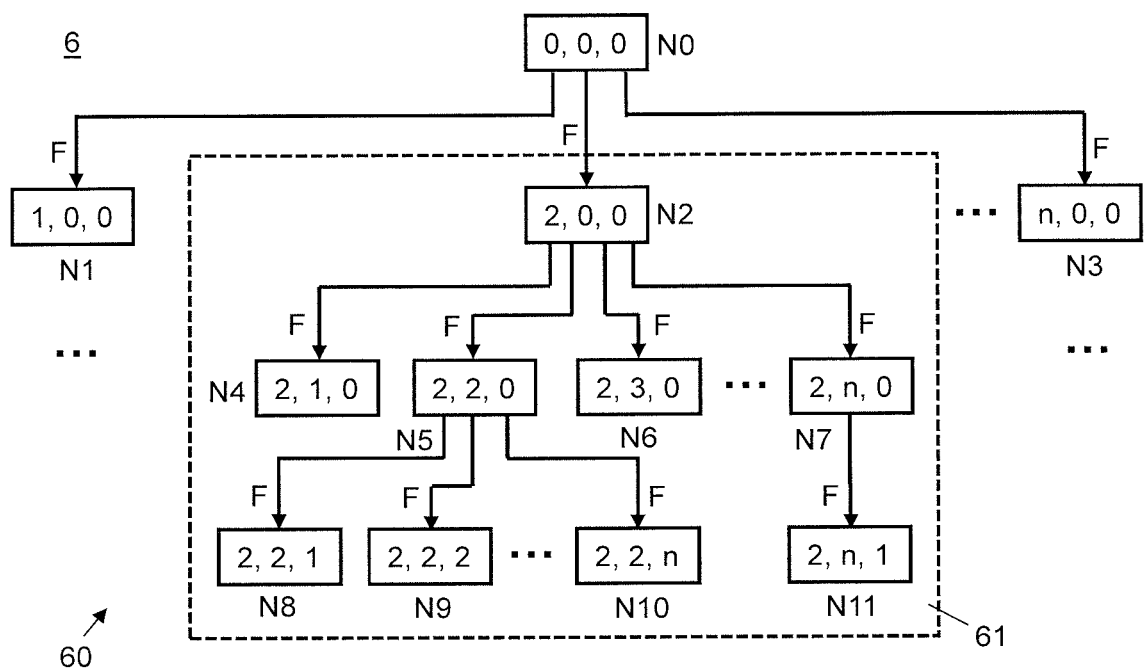
FIG. 5 shows an example of cryptographic key hierarchy configured as a tree structure having a root node and child nodes below the root node, the root node representing a master cryptographic key and the child nodes representing cryptographic keys derived from the master cryptographic key using a one-way function according to the present disclosure.

As illustrated schematically in FIG. 5, lower levels keys at a lower level of the cryptographic key hierarchy 6 are derived by way of a cryptographic one-way function F from upper level keys at a higher level of the cryptographic key hierarchy 6. A one-way function F is a function that is easy to compute for every input, but requires high computational complexity in the inverse direction, i.e. for computing the required input to the function for and from a given output of the function. Examples of one-way functions include AES128 or AES256 Advanced Encryption Standard (AES), as defined by the National Institute of Standards and Technology (NIST).

In the example of a hierarchical tree structure 60 shown in FIG. 5, the root node N0 of the tree structure 60 represents a master cryptographic key. All cryptographic keys at the next lower level from the root node N0, represented by child nodes N1, N2, . . . , N3 in the tree structure 60, are derived by the one-way-function F from the master key represented by the root mode NO. Likewise, the cryptographic keys at the next lower level from node N2, represented by child nodes N4, N5, N6, . . . , N7 in the tree structure 60, are derived by the one-way-function F from the cryptographic key represented by their respective parent node N2; and the cryptographic keys at the next lower level from node N5, represented by child nodes N8, N9, . . . , N10 in the tree structure 60, are derived by the one-way-function F from the cryptographic key represented by their respective parent node N5. As illustrated in FIG. 5, each node and respective cryptographic key of cryptographic key hierarchy 6 is defined by its position (or relative position) in the hierarchical tree structure 60. In the example illustrated in FIG. 5, the hierarchical tree structure 60 has three hierarchical levels below the root node N0 and the position of a node can be defined by three indices. For example, the position of the root node is defined by index values [0,0,0], and the child nodes can be defined by index values [L1,L2,L3] where L1 indicates the position of the node N1, N2, . . . , N3 at the first level below the root node N0, L2 indicates the position of the node N4, N5, N6, . . . , N7 at the second level below the root node N0, and L3 indicates the position of the node N8, N9, N10, . . . , N11 at the third level below the root node N0. The cryptographic key for any node in the hierarchical tree structure 60 can be derived (computed) from the master key of the root node N0 or from the respective parent node or another respective ancestor node using the one-way function F. To derive (compute) the cryptographic key $K_{[L1,L2,L3]}$ for a specific node at level L and position [L1,L2,L3] in the hierarchical tree structure 60, the one-way function F is applied to the upper level cryptographic key $K_{L-1}$ represented by the respective parent node and the position (or relative position) PosL of the specific node at its level L, $K_{[L1,L2,L3]} = F\{K_{L-1}; \text{PosL}\{[L1,L2,L3]\}\}$, i.e. the position PosL at level L among its siblings, i.e. among the children, at level L, of its respective parent node, at the upper level L-1. For example, the cryptographic key $K_{[2,3,0]}$ for node N6 at position [2,3,0] in the hierarchical tree structure 60 is computed by applying the one-way function F to the upper level cryptographic key $K_{[2,0,0]}$ represented by parent node N2 and the position $\text{PosL}\{[2,3,0]\} = 3$ of node N6 at its level L2, $K_{[2,3,0]} = F\{K_{[2,0,0]}; 3\}$.

Figure 8:
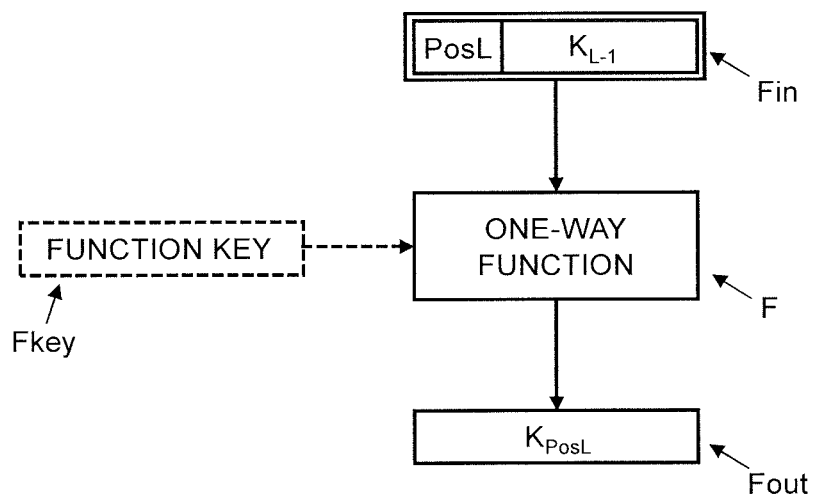
FIG. 8 shows a block diagram illustrating schematically a cryptographic one-way function for deriving a lower level key of a cryptographic key hierarchy from an upper level key at a higher level of the cryptographic key hierarchy according to the present disclosure.

As illustrated in FIG. 8, the one-way function F computes from a function input Fin a function output Fout. The function input includes the position PosL of the lower level cryptographic key $K_{PosL}$, to be derived at the lower level L, and the upper level parent cryptographic key $K_{L-1}$. The position PosL is a bit string that defines the position of the lower level cryptographic key $K_{PosL}$, at the lower level L; its value does not necessarily need to indicate the position numerically, but merely needs to determine unambiguously the position at the respective level L. For example, the position PosL and the upper level parent cryptographic key $K_{L-1}$ from a 128 or 256 bit string data input block Fin for the AES128 or AES256 function, respectively. Depending on the particular one-way function F, a function key Fkey, stored securely in the electronic devices 1, 2, is required for computing the lower level cryptographic key $K_{PosL}$, for example, a 128 bits or 256 bits AES key for the AES128 or AES256 function, respectively. The function output Fout represents the derived lower level cryptographic key $K_{PosL}$, for example, a 128 bits or 256 bits AES key from the AES128 or AES256 function, respectively. In an alternative embodiment, the function input Fin of the one-way function F is kept at a fixed value (stored securely in the electronic devices 1, 2) and the combination of the position PosL of the lower level cryptographic key $K_{PosL}$, to be derived at the lower level L, and the upper level parent cryptographic key $K_{L-1}$ are used as the function key Fkey of the one-way function F.

Depending on the number of levels between the accessible ancestor cryptographic key and the (relative) position of the cryptographic key to be derived, the cryptographic key is derived by computing the one-way function F once, if the accessible ancestor cryptographic key is represented by the direct parent node, or several times, if the accessible ancestor cryptographic key is higher up in the cryptographic key hierarchy 6 and the cryptographic key has to be derived through (down) several levels of the hierarchical tree structure 60. In other words, lower level keys, at a lower level of the cryptographic key hierarchy 6, are derived by applying the cryptographic one-way function F to their upper level keys, at a higher level of the cryptographic key hierarchy 6, to compute the cryptographic key(s) for any node on the direct path from the known or accessible cryptographic key of the ancestor node, up to and including the cryptographic key for the target node defined by the positional information. Thus, the one-way function is applied to the known or accessible cryptographic key and to any intermediary cryptographic key, on the direct path in the cryptographic key hierarchy 6 from the ancestor node with the known or accessible cryptographic key to the target node defined by the positional information.

Lower level cryptographic keys can only be derived from higher level cryptographic keys represented by (direct) ancestor nodes (parent nodes, grandparent nodes, great grandparent nodes, etc.), they cannot be derived from higher level cryptographic keys represented by other (non-ancestor) nodes (uncle nodes) on separate (parallel) branches in the hierarchical tree structure 60. For example, the cryptographic key represented by node N11 can only be derived by cryptographic keys represented by its ancestor nodes N7, N2, and N0; it cannot be derived, however, from cryptographic keys represented by other non-ancestor nodes N4, N5, or N6 (uncle nodes) on separate branches. One skilled in the art will understand that the number of levels and the number of nodes in a level of the hierarchical tree structure 60 or cryptographic key hierarchy 6, respectively, can be set, e.g. by the key authority 5 depending on the requirements of the particular application or scenario.

FIG. 6 illustrates a scenario where metadata 42 with positional information is transferred in a data message 4 from the first electronic device 1 (or its circuit 10, respectively) via communication link 3 to the second electronic device 2. The positional information relates to the position of the cryptographic key used or requested to be used by the first electronic device 1. For example, if the first electronic device 1 uses or requests the cryptographic key represented by node N8 in the hierarchical tree structure 60 of the cryptographic key hierarchy 6, the positional information indicates the respective position [L1,L2,L3]=[2, 2, 1] of the node N8 in the hierarchical tree structure 60. One skilled in the art will understand, that the positional information may define a cryptographic key in the cryptographic key hierarchy 6 by indicating a specific node in the hierarchical tree structure 60 or by specifying a relative position of said specific node with respect to an ancestor node. FIG. 6 further illustrates a scenario where subsequently to the transfer of the data message 4 from the first electronic device 1 to the second electronic device 2, the second electronic device 2 (or its circuit 20, respectively) optionally transfers a data message 4\*\* to the first electronic device 1, which data message 4\*\* includes data 41\*\* encrypted by the electronic device 2. In an authentication process, the encrypted data 41\*\* includes encrypted authentication data, as described later with reference to FIG. 7.

FIG. 1 illustrates a scenario where data 41 encrypted by the first electronic device 1 (or its circuit 10, respectively) is transferred in a data message 4 via communication link 3 to the second electronic device 2. In addition to the encrypted data 41, the data message 4 further comprises metadata with positional information of the cryptographic key used by the first electronic device 1 for encrypting the data.

FIG. 3 illustrates a further scenario where subsequently to the transfer of the data message 4 from the first electronic device 1 to the second electronic device 2, the second electronic device 2 (or its circuit 20, respectively) transfers a data message 4\* to the first electronic device 1, which data message 4\* includes data 41\* encrypted by the electronic device 2 and, optionally, meta data 42\* with positional information of the cryptographic key used by the second electronic device 2 for encrypting the data. In an application where the data includes authentication data, FIG. 3 actually illustrates an authentication process as described later with reference to FIG. 4.

Figure 2:
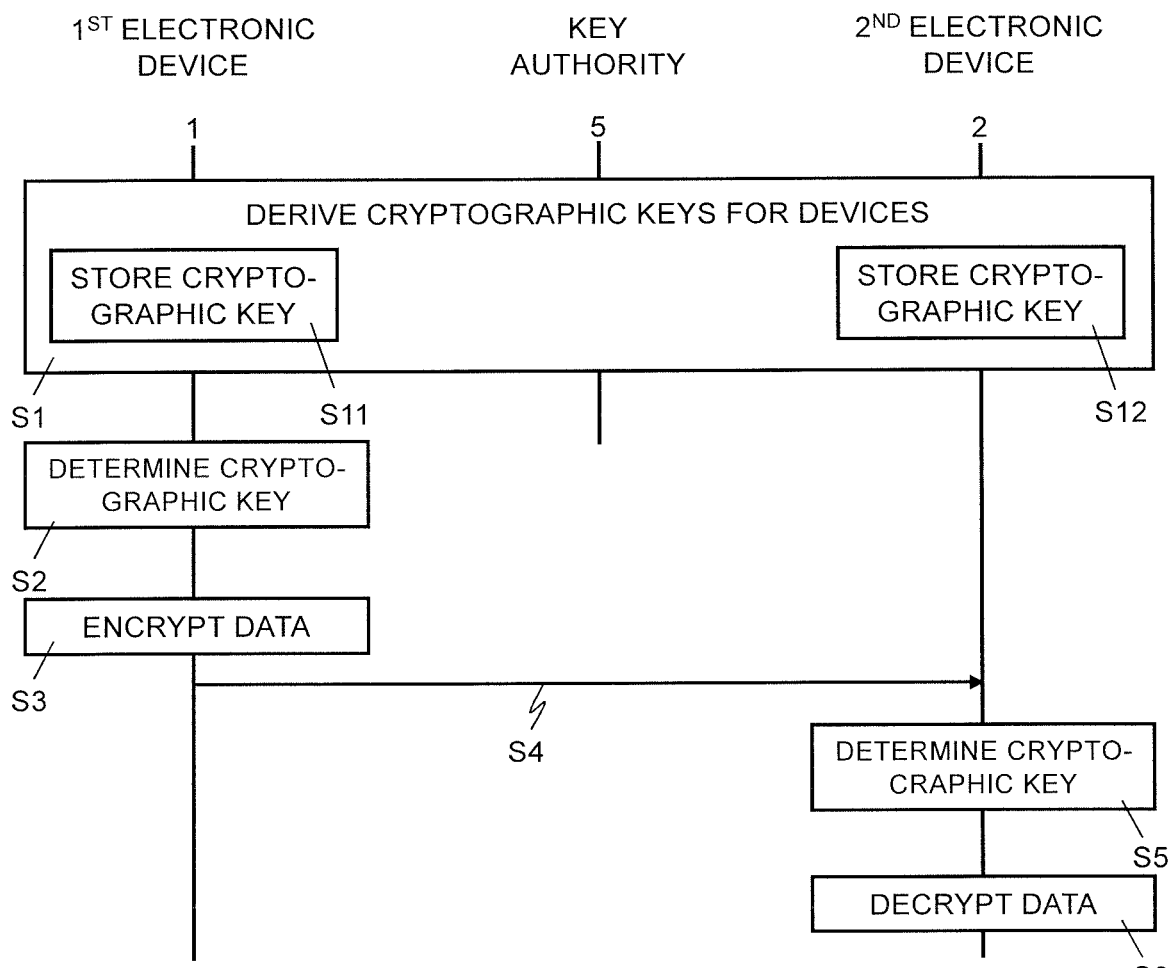
FIG. 2 shows a flow diagram illustrating an exemplary sequence of steps for communicating data securely between a first electronic device and a second electronic device, using symmetric key encryption according to the present disclosure.
Figure 4:
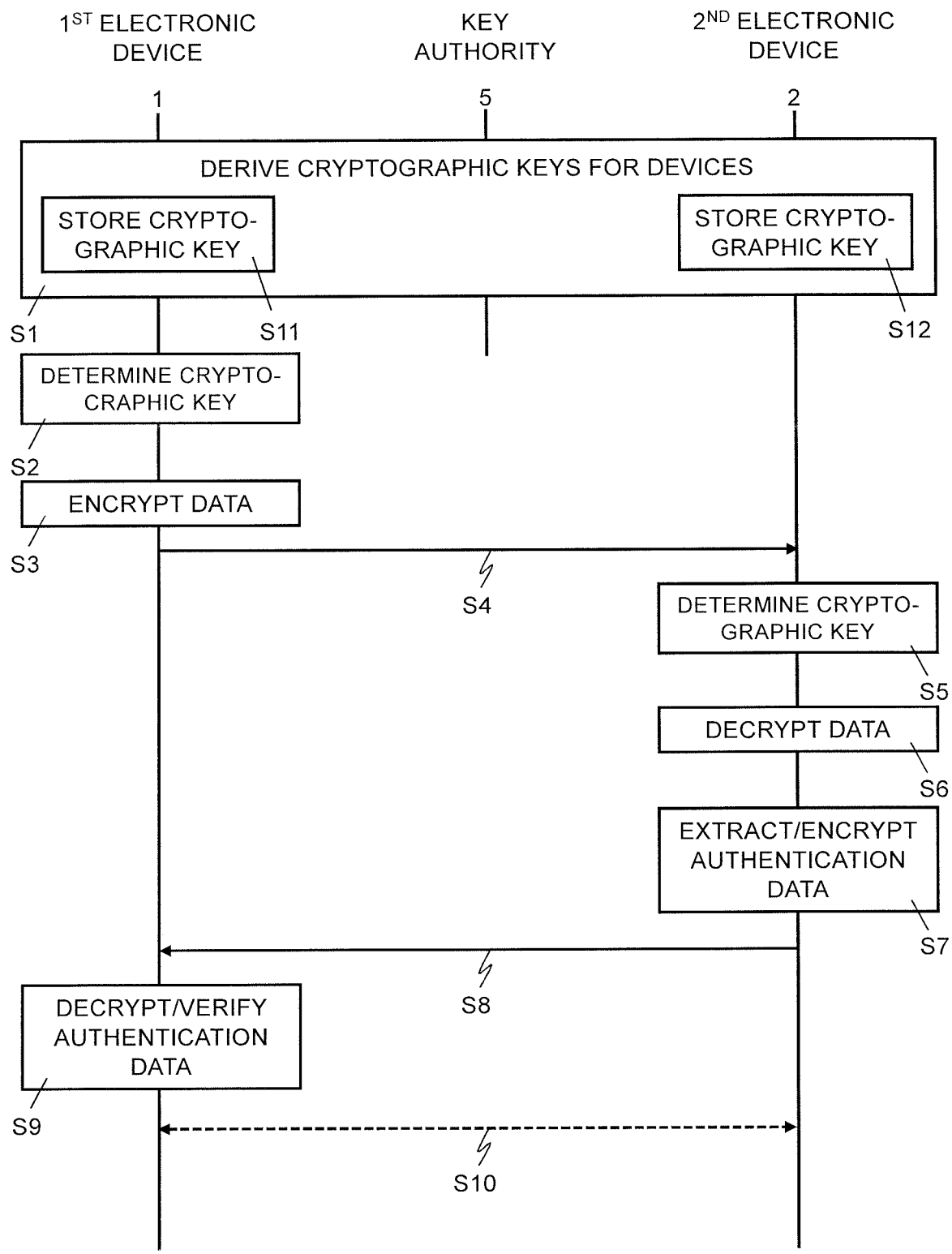
FIG. 4 shows a flow diagram illustrating an exemplary sequence of steps for communicating securely between a first electronic device and a second electronic device, by exchanging and verifying authentication data, using symmetric key encryption according to the present disclosure.
Figure 7:
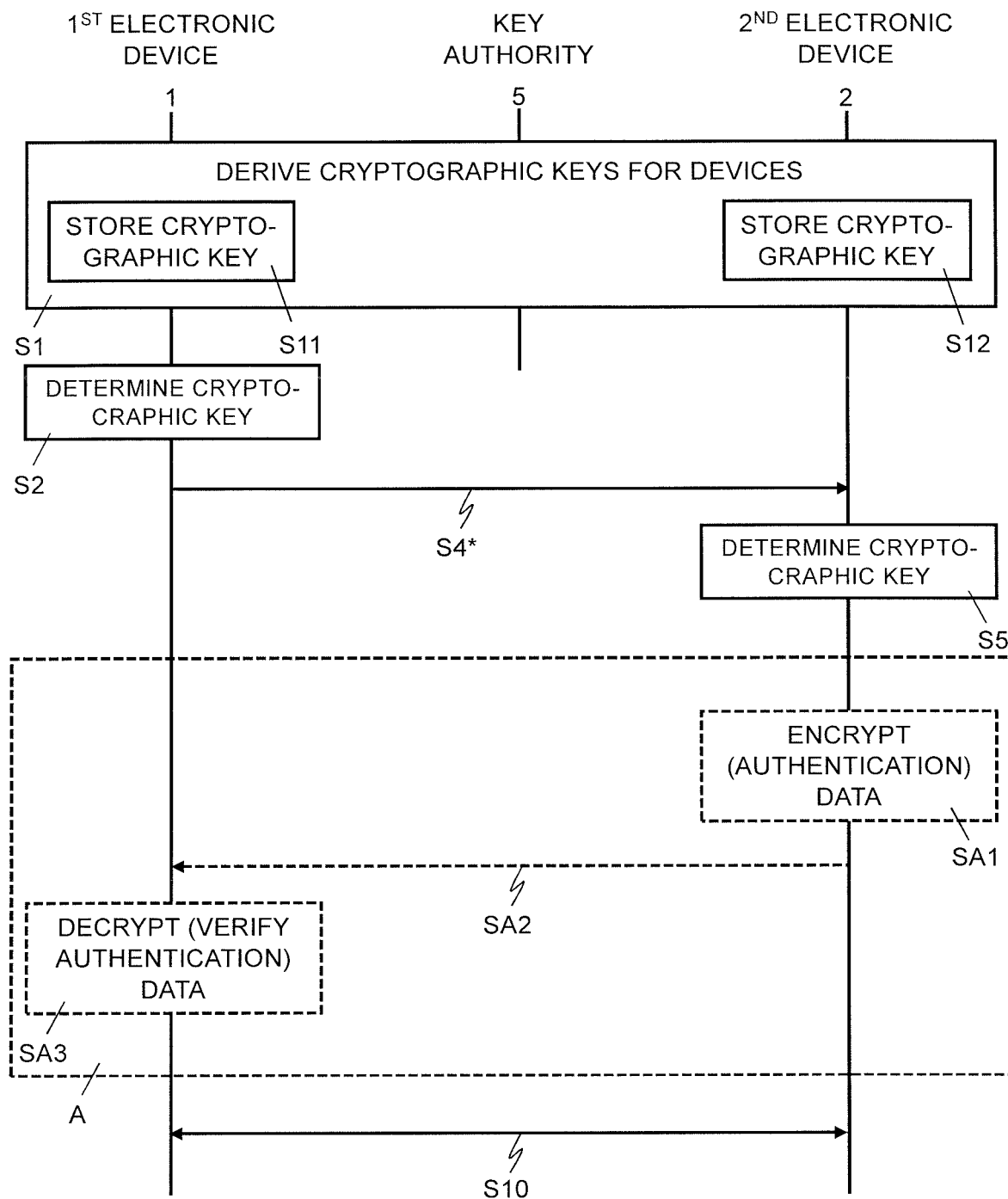
FIG. 7 shows a flow diagram illustrating an exemplary sequence of steps for communicating securely between a first electronic device and a second electronic device, using symmetric key encryption and optionally exchanging and verifying authentication data according to the present disclosure.

In the following paragraphs, described with reference to FIGS. 2, 4 and 7 are possible sequences of steps performed by the key authority 5 and the circuits 10, 20 of the electronic devices 1, 2 for communicating securely between the electronic devices 1, 2 using symmetric key encryption.

As illustrated in FIGS. 2, 4 and 7, in step S1, secret cryptographic keys are derived and stored in the electronic devices 1, 2. Specifically, the secret cryptographic keys 11, 21 stored in the electronic devices 1, 2 are determined from the cryptographic key hierarchy 6, e.g. depending on the level of authorization and/or rights to be given to the respective electronic devices 1, 2. The higher up in the cryptographic key hierarchy 6 the cryptographic key 11, 21 is selected, the more cryptographic keys of lower levels in the cryptographic key hierarchy 6 can be derived from the selected cryptographic keys 11, 21. In steps S11, S12, the cryptographic keys 11, 21 are stored in a secured process in the first electronic device 1 or in the second electronic device 2, e.g. during manufacturing or configuration of the electronic devices 1, 2 and/or in a restricted area, by the key authority 5 or another trusted entity. The cryptographic keys 11, 21 are stored in the electronic devices 1, 2 together with the respective metadata. The metadata of the cryptographic key includes a key space identifier which identifies (defines) the specific cryptographic key hierarchy 6 or a subset 61 of the cryptographic key hierarchy 6 from which the respective cryptographic key was selected or derived. The metadata further includes positional information which defines the (absolute or relative) position of the respective cryptographic key in the specific cryptographic key hierarchy 6 or subset 61 of the cryptographic key hierarchy 6. For example, for the cryptographic key represented by node N8 in the hierarchical tree structure 60, the key space identifier indicates the respective cryptographic key hierarchy 6 or its subset 61, and the positional information indicates the respective position [L1,L2,L3]=[2,2,1] in the hierarchical tree structure 60.

As illustrated in FIGS. 2, 4 and 7, in step S2, the first electronic device 1, or its circuit 10, respectively, determines the cryptographic key to be used for communicating securely with the second electronic device 2. The cryptographic key is determined, for example, depending on the type of the second electronic device 2 or the application/interaction to be performed with second electronic device 2. In essence, the circuit 10 uses the cryptographic key 11 stored in the first electronic device 1 or uses the one-way function and specific positional information to derive a lower level cryptographic key in the cryptographic key hierarchy 6 from the cryptographic key 11 stored in the first electronic device 1.

In the embodiment of FIG. 7, in step S4\*, the first electronic device 1, or its circuit 10, respectively, generates and transfers via communication link 3 to the second electronic device 2 a data message 4. The data message includes metadata associated with the cryptographic key determined in step S2. The metadata 42 includes the positional information of the cryptographic key and/or the key space identifier of the specific cryptographic key hierarchy 6 or cryptographic key hierarchy subset 61 including the cryptographic key.

In step S5, the second electronic device 2 or its circuit 20, respectively, receives the data message 4 from the first electronic device 1 and determines the cryptographic key defined by the metadata 42 included in the data message 4. If there are several secret cryptographic keys 21 stored in the second electronic device 2, the circuit 20 uses the key space identifier included in the metadata 42 to determine the applicable cryptographic key hierarchy 6 or subset 61 of the cryptographic key hierarchy 6. By comparing the positional information stored in the second electronic device 2 for the secret cryptographic key 21 (of the applicable cryptographic key hierarchy 6 or subset 61) to the positional information received with the metadata for the cryptographic key used by the first electronic device 1, the circuit 20 determines whether the secret cryptographic key 21 stored in the second electronic device 2 is at a corresponding position in the cryptographic key hierarchy 6 and can thus be used for decrypting the received encrypted data 41, or whether the secret cryptographic key 21 is a suitable ancestor in the cryptographic key hierarchy 6 for deriving a cryptographic key matching the position of the cryptographic key specified by the first electronic device 1 in the cryptographic key hierarchy 6. If either of these cases is not possible, the circuit 20 rejects the data message 4 from the first electronic device 1 and/or generates an error message. Otherwise, the circuit 20 obtains the stored secret cryptographic key 21 for decrypting the encrypted data 41 or for deriving the cryptographic key specified by the first electronic device 1 by way of the one-way function F, using the positional information received in the metadata 42. For example, if the secret cryptographic key 21 stored in the second electronic device 2 corresponds to the ancestor cryptographic key represented by node N5 in the cryptographic key hierarchy 6 or subset 61, and if the positional information received from the first electronic device 1 indicates the position [L1,L2,L3]=[2,2,1] of node N8 in the hierarchical tree structure 60, the circuit 20 derives the cryptographic key represented by child node N8 from the stored secret cryptographic key 21 (represented by ancestor node N5), using the one-way function F and the positional information [L1,L2,L3]=[2,2,1] of node N8.

Subsequently, the cryptographic key determined in step S5 is used by the second electronic device 2 or its circuit 20, respectively, for performing secured data communication with the first electronic device 1, e.g. by exchanging encrypted data using symmetric key encryption as indicated by step S10.

In FIG. 7, reference numeral A refers to a block of optional steps for executing an authentication process subsequently to performing the steps S1, S2, S4*, and S5 of FIG. 7.

In step SA1, the second electronic device 2 or its circuit 20, respectively, generates an authentication data message 4**, by encrypting authentication data using the cryptographic key determined in step S5. For example, the authentication data includes data received from the first electronic device 1, e.g. the positional information previously received with the metadata 42, and a nonce, e.g. a random number and/or a time stamp.

In step SA2, the second electronic device 2 or its circuit 20, respectively, transmits the authentication data message 4 with the encrypted (authentication) data 4 via communication link 3 to the first electronic device 1.

In step SA3, the first electronic device 1, or its circuit 10, respectively, receives the authentication data message 4 from the second electronic device 2 and decrypts the authentication data message 4 using the cryptographic key determined in step S2 to obtain the authentication data. Subsequently, the circuit 10 verifies the authentication data received, in encrypted form in the authentication message 4**, from the second electronic device 2, by comparing it to the original authentication data, e.g. the positional information determined in step S2. If the original authentication data of the first electronic device 1 matches the authentication data obtained and decrypted from the authentication message 4*, authenticity of the authentication data and thus the second electronic device 2 is confirmed. If that is the case, secure data communication between the electronic devices 1, 2 may be executed in step S10. Otherwise, the circuit 10 rejects the authentication data message 4** from the second electronic device 2 and/or generates an error message.

In the embodiment of FIG. 2, in step S3, the first electronic device 1, or its circuit 10, respectively, uses the cryptographic key determined in step S2 to encrypt the data to be transmitted via communication link 3 to the second electronic device 2. In case of an authentication process, the data includes authentication data, e.g. including a nonce with a time stamp and/or a random number.

In step S4, the first electronic device 1, or its circuit 10, respectively, generates and transmits via communication link 3 to the second electronic device 2 a data message 4. The data message includes the encrypted data 41 and metadata associated with the cryptographic key used to encrypt the data. The metadata 42 includes the positional information of the cryptographic key and/or the key space identifier of the specific cryptographic key hierarchy 6 or cryptographic key hierarchy subset 61 including the cryptographic key.

In step S5, as described above in connection with FIG. 7, the second electronic device 2 or its circuit 20, respectively, receives the data message 4 from the first electronic device 1 and determines a cryptographic key for decrypting the encrypted data 41 included in the data message 4.

In step S6, the second electronic device 2 or its circuit 20, respectively, uses the cryptographic key determined in step S5 to decrypt the encrypted data 41 received from the first electronic device 1.

While the sequence of steps S2, S3, S4, S5 and S6, described above makes it possible to securely communicate encrypted data between electronic devices 1, 2 (by changing the roles of encryption device and decryption device in both directions), the further steps S7, S8, S9, described below with reference to FIG. 4, make it possible to implement an authentication process between the electronic devices 1, 2 to establish secure and authenticated communication between the electronic devices 1, 2.

In the authentication process illustrated in FIGS. 3 and 4, the data encrypted in step S3 by the first electronic device 1, or its circuit 10, respectively, includes authentication data. As illustrated in FIG. 4, in step S7, the second electronic device 2 or its circuit 20, respectively, extracts the authentication data from the data decrypted in step S6. In step S7, the circuit 20 uses the same cryptographic key, determined in step S5 and used in S6 to decrypt the encrypted data 41 received from the first electronic device 1, to encrypt the authentication data. The circuit 20 generates a response data message 4* which includes the encrypted authentication data 41* and optionally metadata 42*.

In step S8, the second electronic device 2 or its circuit 20, respectively, transmits the response data message 4* via communication link 3 to the first electronic device 1.

In step S9, the first electronic device 1 or its circuit 10, respectively, receives the response data message 4* from the second electronic device 2 and decrypts the encrypted authentication data 41 using the cryptographic key used previously in step S3 to encrypt the data for the second electronic device 2. Subsequently, the circuit 10 verifies the decrypted authentication data received, in encrypted form in the response data message 4*, from the second electronic device 2, by comparing it to the original authentication data, defined at the first electronic device 1 before it was encrypted and transmitted to the second electronic device 2 in steps S3 and S4, respectively. If the original authentication data of the first electronic device 1 matches the authentication data decrypted from the response data message 4* received from the second electronic device 2, authenticity of the authentication data and thus the second electronic device 2 is confirmed. If that is the case, secure data communication between the electronic devices 1, 2 may be executed in step S10. Otherwise, the circuit 10 rejects the response data message 4* from the second electronic device 2 and/or generates an error message.

It should be noted that, in the description, the computer program code has been associated with specific functional modules and the sequence of the steps has been presented in a specific order, one skilled in the art will understand, however, that the computer program code may be structured differently and that the order of at least some of the steps could be altered, without deviating from the scope of the disclosure.

The invention claimed is:

1. A method of communicating securely between electronic devices using symmetric key encryption, the method comprising:
    transferring from a first electronic device to a second electronic device a data message with metadata, the metadata including positional information of a first cryptographic key of a cryptographic key hierarchy, whereby in the cryptographic key hierarchy a lower level cryptographic key, being positioned in a lower level in the cryptographic key hierarchy than a higher level cryptographic key, is derived by way of a one-way function from the higher level cryptographic key and positional information defining a position of the lower level cryptographic key in the cryptographic key hierarchy;
    deriving, by a circuit of the second electronic device, the first cryptographic key by way of the one-way function from a second cryptographic key, stored in the second electronic device, and the positional information received from the first electronic device;
    generating, by the circuit of the second electronic device, an authentication data message, by encrypting authentication data included in the metadata received from the first electronic device, using the first cryptographic key;
    transmitting the authentication data message from the second electronic device to the first electronic device;
    decrypting the authentication data message by a circuit of the first electronic device using the first cryptographic key to obtain the authentication data;
    confirming authenticity of the second electronic device by the circuit of the first electronic device verifying the authentication data; and
    upon confirming authenticity of the second electronic device, communicating data securely between the first electronic device and the second electronic device.

2. The method of claim 1, wherein generating the authentication data message comprises the circuit of the second electronic device encrypting, as the authentication data, the positional information received from the first electronic device, using the first cryptographic key; the circuit of the first electronic device decrypts the authentication data message, using the first cryptographic key to obtain the positional information; and
    confirming the authenticity of the second electronic device comprises the circuit of the first electronic device verifying the authentication data by comparing the positional information obtained by decrypting the authentication data message to the positional information included in the metadata.

3. The method of claim 2, further comprising:
    storing in the second electronic device positional information of the second cryptographic key; and
    determining the first cryptographic key by the circuit of the second electronic device deriving the first cryptographic key by way of the one-way function from the second cryptographic key, stored in the second electronic device, the positional information of the second cryptographic key, and the positional information received from the first electronic device.

4. The method of claim 1, further comprising storing in the second electronic device positional information of the second cryptographic key; and
    determining the first cryptographic key by the circuit of the second electronic device deriving the first cryptographic key by way of the one-way function from the second cryptographic key, stored in the second electronic device, the positional information of the second cryptographic key, and the positional information received from the first electronic device.

5. The method of claim 4, further comprising:
    transferring from the first electronic device to the second electronic device a key space identifier included in the metadata, the key space identifier defining the cryptographic key hierarchy or a subset of the cryptographic key hierarchy which include the first cryptographic key; and
    the circuit of the second electronic device selecting the second cryptographic key, for deriving the first cryptographic key, from a plurality of secret cryptographic keys stored in the second electronic device, using the key space identifier received from the first electronic device.

6. The method of claim 1, further comprising transferring from the first electronic device to the second electronic device a key space identifier included in the metadata, the key space identifier defining the cryptographic key hierarchy or a subset of the cryptographic key hierarchy which include the first cryptographic key); and the circuit of the second electronic device selecting the second cryptographic key, for deriving the first cryptographic key, from a plurality of secret cryptographic keys stored in the second electronic device, using the key space identifier received from the first electronic device.

7. The method of claim 6, further comprising:
    encrypting, by the circuit of the first electronic device, data using the first cryptographic key;
    transferring from the first electronic device to the second electronic device the data message including the encrypted data and the metadata;
    deriving, by the circuit of the second electronic device, the first cryptographic key by way of the one-way function from the second cryptographic key, stored in the second electronic device, using the metadata included in the data message; and
    decrypting, by the circuit of the second electronic device, the encrypted data included in the data message, using the first cryptographic key.

8. The method of claim 1, further comprising the circuit of the first electronic device encrypting data using the first cryptographic key; transferring from the first electronic device to the second electronic device the data message including the encrypted data and the metadata; deriving, by the circuit of the second electronic device, the first cryptographic key by way of the one-way function from the second cryptographic key, stored in the second electronic device, using the metadata included in the data message; and decrypting, by the circuit of the second electronic device, the encrypted data included in the data message, using the first cryptographic key.

9. The method of claim 1, wherein the cryptographic key hierarchy is configured as a tree structure and the positional information defines a node in the tree structure, whereby each node in the tree structure represents a cryptographic key, a root node in the tree structure represents a master cryptographic key, nodes in the tree structure at one level below the root node represent cryptographic keys derived by way of the one-way function from the master cryptographic key, and a child node at a lower level in the tree structure represents a cryptographic key derived by way of the one-way function from the cryptographic key represented by a respective parent node of the child node in the tree structure.

10. An electronic device for communicating securely with another electronic device, using symmetric encryption, the electronic device comprising a circuit configured to perform the steps of:
   transferring to the other electronic device a data message with metadata, the metadata including positional information of a first cryptographic key of a cryptographic key hierarchy, whereby in the cryptographic key hierarchy a lower level cryptographic key, being positioned in a lower level in the cryptographic key hierarchy than a higher level cryptographic key, is derived by way of a one-way function from the higher level cryptographic key and positional information defining a position of the lower level cryptographic key in the cryptographic key hierarchy, the metadata enabling the other electronic device to derive the first cryptographic key by way of the one-way function from a second cryptographic key, stored in the other electronic device, and the positional information included in the metadata, and to generate an authentication data message, by encrypting authentication data included in the metadata using the first cryptographic key;
   receiving the authentication data message from the other electronic device;
   decrypting the authentication data message using the first cryptographic key to obtain the authentication data;
   confirming authenticity of the other electronic device by verifying the authentication data; and
   upon confirming authenticity of the other electronic device, communicating data securely with the other electronic device.

11. The electronic device of claim 10, wherein the positional information included in the metadata enables the other electronic device to generate the authentication data message, by encrypting, as the authentication data, the positional information included in the metadata, using the first cryptographic key; and the circuit is further configured to decrypt the authentication data message, using the first cryptographic key to obtain the positional information, and to confirm the authenticity of the other electronic device by comparing the positional information included in the metadata to the positional information obtained by decrypting the authentication data message.

12. The electronic device of claim 10, wherein the circuit is further configured to transfer to the other electronic device a key space identifier included in the metadata, the key space identifier defining the cryptographic key hierarchy or a subset of the cryptographic key hierarchy which include the first cryptographic key, enabling the other electronic device to select the second cryptographic key, for deriving the first cryptographic key, from a plurality of secret cryptographic keys stored in the other electronic device, using the key space identifier received from the other electronic device.

13. The electronic device of claim 10, wherein the circuit is further configured to encrypt data using the first cryptographic key; to transfer to the other electronic device the data message including the encrypted data and the metadata, enabling the other electronic device to derive the first cryptographic key, using the metadata included in the data message, and to decrypt the encrypted data included in the data message, using the first cryptographic key.

14. A computer program product comprising a non-transient computer-readable medium having stored thereon computer program code configured to control a circuit of a first electronic device for communicating securely with a second electronic device using symmetric key encryption, such that the first electronic device performs the steps of:
   transferring to the second electronic device a data message with metadata the metadata including positional information of a first cryptographic key of a cryptographic key hierarchy, whereby in the cryptographic key hierarchy a lower level cryptographic key, being positioned in a lower level in the cryptographic key hierarchy than a higher level cryptographic key, is derived by way of a one-way function from the higher level cryptographic key and positional information defining a position of the lower level cryptographic key in the cryptographic key hierarchy, the metadata enabling the second electronic device to derive the first cryptographic key by way of the one-way function from a second cryptographic key, stored in the second electronic device, and the positional information included in the metadata, and to generate an authentication data message, by encrypting authentication data included in the metadata using the first cryptographic key;
   receiving the authentication data message from the second electronic device;
   decrypting the authentication data message using the first cryptographic key to obtain the authentication data;
   confirming authenticity of the second electronic device by verifying the authentication data; and
   upon confirming authenticity of the second electronic device, communicating data securely with the second electronic device.

15. An electronic device for communicating securely with another electronic device using symmetric key encryption, the electronic device comprising a circuit configured to perform the steps of:
   receiving from the other electronic device a data message with metadata, the metadata including positional information of a first cryptographic key of a cryptographic key hierarchy, whereby in the cryptographic key hierarchy a lower level cryptographic key, being positioned in a lower level in the cryptographic key hierarchy than a higher level cryptographic key, is derived by way of a one-way function from the higher level cryptographic key and positional information defining a position of the lower level cryptographic key in the cryptographic key hierarchy;
   deriving the first cryptographic key by way of the one-way function from a second cryptographic key, stored in the electronic device, and the positional information received from the other electronic device;
   generating an authentication data message, by encrypting authentication data included in the metadata received from the other electronic device, using the first cryptographic key;
   transmitting the authentication data message to the other electronic device, enabling the other electronic device to decrypt the authentication data message, using the first cryptographic key to obtain the authentication data, to confirm authenticity of the electronic device by verifying the authentication data, and upon confirming authenticity of the electronic device, to communicate data securely with the electronic device.

16. The electronic device of claim 15, wherein the circuit is configured to generate the authentication data message by encrypting, as the authentication data, the positional information received from the other electronic device, using the first cryptographic key, enabling the other electronic device to decrypt the authentication data message, using the first cryptographic key to obtain the positional information, and to confirm the authenticity of the electronic device by comparing the positional information obtained by decrypting the authentication data message to the positional information included in the metadata.

17. The electronic device of claim 15, wherein the circuit is further configured to store in the electronic device positional information of the second cryptographic key; and to derive the first cryptographic key by way of the one-way function from the second cryptographic key, stored in the electronic device, the positional information of the second cryptographic key, and the positional information received from the other electronic device.

18. The electronic device of claim 15, wherein the circuit is further configured to receive from the other electronic device a key space identifier included in the metadata, the key space identifier defining the cryptographic key hierarchy or a subset of the cryptographic key hierarchy which include the first cryptographic key; and to select the second cryptographic key for deriving the first cryptographic key from a plurality of secret cryptographic keys stored in the electronic device, using the key space identifier received from the other electronic device.

19. The electronic device of claim 15, wherein the circuit is further configured to receive in the data message from the other electronic device encrypted data and metadata; to derive the first cryptographic key by way of the one-way function from the second cryptographic key, stored in the second electronic device, using the metadata included in the data message; and to decrypt the encrypted data included in the data message, using the first cryptographic key.

20. A computer program product comprising a non-transient computer-readable medium having stored thereon computer program code configured to control a circuit of a second electronic device, for communicating securely with a first electronic device using symmetric key encryption, such that the second electronic device performs the steps of:
receiving from the first electronic device a data message with metadata, the metadata including positional information of a first cryptographic key of a cryptographic key hierarchy, whereby in the cryptographic key hierarchy a lower level cryptographic key, being positioned in a lower level in the cryptographic key hierarchy than a higher level cryptographic key, is derived by way of a one-way function from the higher level cryptographic key and positional information defining a position of the lower level cryptographic key in the cryptographic key hierarchy;
deriving the first cryptographic key by way of the one-way function from a second cryptographic key, stored in the second electronic device, and the positional information received from the first electronic device; and
generating an authentication data message, by encrypting authentication data included in the metadata received from the first electronic device, using the first cryptographic key;
transmitting the authentication data message to the first electronic device, enabling the first electronic device to decrypt the authentication data message, using the first cryptographic key to obtain the authentication data, to confirm authenticity of the second electronic device by verifying the authentication data, and upon confirming authenticity of the second electronic device, to communicate data securely with the first electronic device.

* * * * *